US012088675B1

(12) United States Patent
Dixon et al.

(10) Patent No.: US 12,088,675 B1
(45) Date of Patent: *Sep. 10, 2024

(54) SYSTEMS AND METHODS FOR REESTABLISHING COMMUNICATION TO RESUME A PROCESS BASED ON INFERRED INTENT

(71) Applicant: United Services Automobile Association (USAA), San Antonio, TX (US)

(72) Inventors: David Patrick Dixon, Boerne, TX (US); Kevin Kenneth Fiedler, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,892

(22) Filed: Oct. 5, 2023

Related U.S. Application Data

(63) Continuation of application No. 17/898,172, filed on Aug. 29, 2022, now Pat. No. 11,785,093, which is a
(Continued)

(51) Int. Cl.
*H04L 67/14* (2022.01)
*G06F 40/174* (2020.01)
*H04L 67/01* (2022.01)

(52) U.S. Cl.
CPC ............ *H04L 67/14* (2013.01); *G06F 40/174* (2020.01); *H04L 67/01* (2022.05)

(58) Field of Classification Search
CPC ....... H04L 67/01; H04L 67/02; H04L 67/025; H04L 67/04; H04L 67/06; H04L 67/08; H04L 67/10; H04L 67/1001; H04L 67/1004; H04L 67/1006; H04L 67/1008; H04L 67/101; H04L 67/1012;
(Continued)

(56) References Cited

U.S. PATENT DOCUMENTS 6,157,721 A 12/2000 Shear et al.
6,658,568 B1 12/2003 Ginter et al.
(Continued)

FOREIGN PATENT DOCUMENTS

EP 1325425 B1 8/2007
WO 2008151217 A2 12/2008

*Primary Examiner* — Kostas J Katsikis
(74) *Attorney, Agent, or Firm* — Fletcher Yoder, P.C.

(57) ABSTRACT

A system may include a communication device that may enable a user to complete a digital form via a first communication session. The system may include a processor that may determine that the user has not completed the digital form, determine one or more issues associated with the user not completing the digital form based on a progress point associated with the digital form, determine a communication channel to use to follow up with the user regarding the digital form based on a data profile associated with the user, the one or more issues, or both, and establish a second communication session with the user via the communication channel to present the digital form at the progress point, such that the user can continue to complete the digital form using the second communication session.

20 Claims, 3 Drawing Sheets

Related U.S. Application Data continuation of application No. 17/231,826, filed on Apr. 15, 2021, now Pat. No. 11,463,528, which is a continuation of application No. 16/523,449, filed on Jul. 26, 2019, now Pat. No. 10,992,513.

(60) Provisional application No. 62/753,543, filed on Oct. 31, 2018.

(58) Field of Classification Search
CPC ............ H04L 67/1014; H04L 67/1017; H04L 67/1019; H04L 67/1021; H04L 67/1023; H04L 67/1025; H04L 67/1027; H04L 67/1029; H04L 67/1031; H04L 67/1034; H04L 67/1036; H04L 67/1038; H04L 67/104; H04L 67/1042; H04L 67/1044; H04L 67/1046; H04L 67/1048; H04L 67/1051; H04L 67/1053; H04L 67/1055; H04L 67/1057; H04L 67/1059; H04L 67/1061; H04L 67/1063; H04L 67/1065; H04L 67/1068; H04L 67/107; H04L 67/1072; H04L 67/1074; H04L 67/1076; H04L 67/1078; H04L 67/108; H04L 67/1082; H04L 67/1085; H04L 67/1087; H04L 67/1089; H04L 67/1091; H04L 67/1093; H04L 67/1095; H04L 67/1097; H04L 67/12; H04L 67/14; H04L 67/125; H04L 67/131; H04L 67/133; H04L 67/1396; H04L 67/2866; H04L 67/2869; H04L 67/2871; H04L 67/2876; H04L 67/288; H04L 67/2885; H04L 67/289; H04L 67/2895; H04L 67/30; H04L 67/303; H04L 67/306; G06F 40/174
See application file for complete search history.

(56) References Cited

U.S. PATENT DOCUMENTS

| | | | |
|---|---|---|---|
| 6,859,834 B1 | 2/2005 | Arora et al. | |
| 7,516,220 B1 | 4/2009 | Stiert | |
| 7,657,871 B2 | 2/2010 | Velupillai | |
| 7,818,219 B2 | 10/2010 | Klivington et al. | |
| 8,751,393 B1 | 6/2014 | Murray et al. | |
| 8,752,042 B2 | 6/2014 | Ratica | |
| 9,928,230 B1 | 3/2018 | Cao et al. | |
| 9,972,005 B2 | 5/2018 | Wong et al. | |
| 10,425,274 B2 | 2/2019 | Obembe et al. | |
| 10,332,074 B1 | 6/2019 | Gallagher et al. | |
| 10,395,108 B1 | 8/2019 | Geng et al. | |
| 10,437,663 B2 | 10/2019 | Symington et al. | |
| 10,460,392 B1 * | 10/2019 | Etheridge | G06Q 40/08 |
| 10,528,858 B1 | 1/2020 | Murphy et al. | |
| 10,565,300 B2 | 2/2020 | Kloiber et al. | |
| 10,637,967 B2 | 4/2020 | Bonig et al. | |
| 10,657,502 B2 | 5/2020 | Dheer et al. | |
| 10,666,543 B2 | 5/2020 | Ratica | |
| 10,740,547 B2 * | 8/2020 | Malek | G06F 40/186 |
| 10,762,286 B2 | 9/2020 | Kolesov et al. | |
| 2002/0040312 A1 | 4/2002 | Dhar et al. | |
| 2002/0070976 A1 | 6/2002 | Tanner et al. | |
| 2002/0087912 A1 | 7/2002 | Kashyap | |
| 2002/0103663 A1 | 8/2002 | Bankier et al. | |
| 2002/0103712 A1 | 8/2002 | Rollins et al. | |
| 2002/0120538 A1 | 8/2002 | Corrie et al. | |
| 2006/0069640 A1 | 3/2006 | Fitzgerald et al. | |
| 2006/0080186 A1 | 4/2006 | Burchetta et al. | |
| 2007/0164554 A1 | 7/2007 | Krone et al. | |
| 2008/0114679 A1 | 5/2008 | Burchetta et al. | |
| 2008/0140582 A1 | 6/2008 | Burchetta et al. | |
| 2008/0262873 A1 | 10/2008 | Bayne et al. | |
| 2009/0288012 A1 | 11/2009 | Hertel et al. | |
| 2009/0307004 A1 * | 12/2009 | Quinn, Jr. | G09B 19/18 707/E17.014 |
| 2010/0306083 A1 | 12/2010 | Oren | |
| 2011/0025842 A1 | 2/2011 | King et al. | |
| 2011/0145068 A1 | 6/2011 | King et al. | |
| 2014/0279573 A1 | 9/2014 | Coats et al. | |
| 2014/0380179 A1 | 12/2014 | Bose et al. | |
| 2015/0215305 A1 | 7/2015 | Wetzel et al. | |
| 2015/0233733 A1 | 8/2015 | Parks, III et al. | |
| 2016/0217530 A1 | 7/2016 | Hashim | |
| 2017/0061411 A1 | 3/2017 | Sherman | |
| 2017/0116169 A1 | 4/2017 | Malek et al. | |
| 2017/0140373 A1 | 5/2017 | De Villiers | |
| 2017/0285879 A1 | 10/2017 | Pilkington et al. | |
| 2018/0054410 A1 | 2/2018 | Bhagwan et al. | |
| 2019/0073666 A1 | 3/2019 | Ortiz et al. | |
| 2019/0087398 A1 | 3/2019 | Kolesov et al. | |
| 2019/0197556 A1 | 6/2019 | Moshal et al. | |
| 2019/0295163 A1 | 9/2019 | Zurick et al. | |
| 2019/0303662 A1 | 10/2019 | Madhani et al. | |
| 2019/0334845 A1 | 10/2019 | Rieseberg | |
| 2019/0362398 A1 | 11/2019 | Greenberger et al. | |
| 2019/0385228 A1 | 12/2019 | Kim et al. | |
| 2020/0074294 A1 | 3/2020 | Long et al. | |
| 2020/0134597 A1 | 4/2020 | Berdugo et al. | |
| 2020/0372209 A1 | 11/2020 | Kolesov et al. | |
| 2021/0334903 A1 | 10/2021 | Etheridge et al. | |

\* cited by examiner

SYSTEMS AND METHODS FOR REESTABLISHING COMMUNICATION TO RESUME A PROCESS BASED ON INFERRED INTENT

CROSS-REFERENCE TO RELATED APPLICATION

The present disclosure is a continuation of and claims priority to U.S. patent application Ser. No. 17/898,172, filed Aug. 29, 2022, titled "SYSTEMS AND METHODS FOR REESTABLISHING COMMUNICATION TO RESUME A PROCESS BASED ON INFERRED INTENT," which is a continuation of and claims priority to U.S. patent Application Ser. No. 17/231,826, filed Apr. 15, 2021, titled "SYSTEMS AND METHODS FOR REESTABLISHING COMMUNICATION TO RESUME A PROCESS BASED ON INFERRED INTENT," now U.S. Pat. No. 11,463,528, which is a continuation of and claims priority to U.S. patent application Ser. No. 16/523,449, filed Jul. 26, 2019, titled "SYSTEMS AND METHODS FOR REESTABLISHING COMMUNICATION TO RESUME A PROCESS BASED ON INFERRED INTENT," now U.S. Pat. No. 10,992,513, which claims priority to U.S. Provisional Patent Application No. 62/753,543, entitled "SYSTEMS AND METHODS FOR REESTABLISHING COMMUNICATION TO RESUME A PROCESS BASED ON INFERRED INTENT," filed Oct. 31, 2018, the entireties of which are incorporated by reference into the present disclosure.

BACKGROUND

The present disclosure relates generally to systems and methods for reestablishing a communication channel with a user based on an intent inferred from the user's actions. More specifically, the present disclosure relates to systems and methods for determining a user's intent based on actions performed via an electronic form or interface and reestablishing a communication with the user based on the determined intent.

As users use various types of electronic devices to complete digital forms and requests via applications, websites, and the like, the users may fail to complete the digital form for a variety of reasons. After the user fails to complete the form, however, the user may start the process for completing the form from the beginning. In some cases, the user may hesitate or may be delayed (e.g., due to technical issues, system issues, etc.) to complete the form for a variety of reasons. With this in mind, it is now recognized that it may be useful to provide systems and methods that reestablish a communication channel with the user based on an inferred reason for the user's failure for completing the digital form or request.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a communication device that may enable a user to complete a digital form via a first communication session. The system may include a processor that may determine that the user has not completed the digital form, determine one or more issues associated with the user not completing the digital form based on a progress point associated with the digital form, determine a communication channel to use to follow up with the user regarding the digital form based on a data profile associated with the user, the one or more issues, or both, and establish a second communication session with the user via the communication channel.

In another embodiment, a method may include determining, via a processor, that a user has not completed a digital form requesting a product or service from an organization during a first communication session. The method may also include determining, via the processor, one or more issues associated with the user not completing the digital form based on a progress point associated with the digital form, such that the progress point corresponds to at least one inquiry of the digital form that has not been completed. The method may also involve determining a communication channel to use to follow up with the user regarding the digital form based on a data profile associated with the user, the one or more issues, or both, and establishing a second communication session with the user via the communication channel.

In yet another embodiment, a non-transitory computer-readable medium may include computer-executable instructions that, when executed, cause a processor to determine that a user has not completed a digital form requesting a product or service from an organization during a first communication session, and determine one or more issues associated with the user not completing the digital form based on a progress point associated with the digital form, such that the progress point corresponds to at least one inquiry of the digital form that has not been completed. The processor may then determine a communication channel to use to follow up with the user regarding the digital form based on a data profile associated with the user, the one or more issues, or both, and establish a second communication session with the user via the communication channel.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
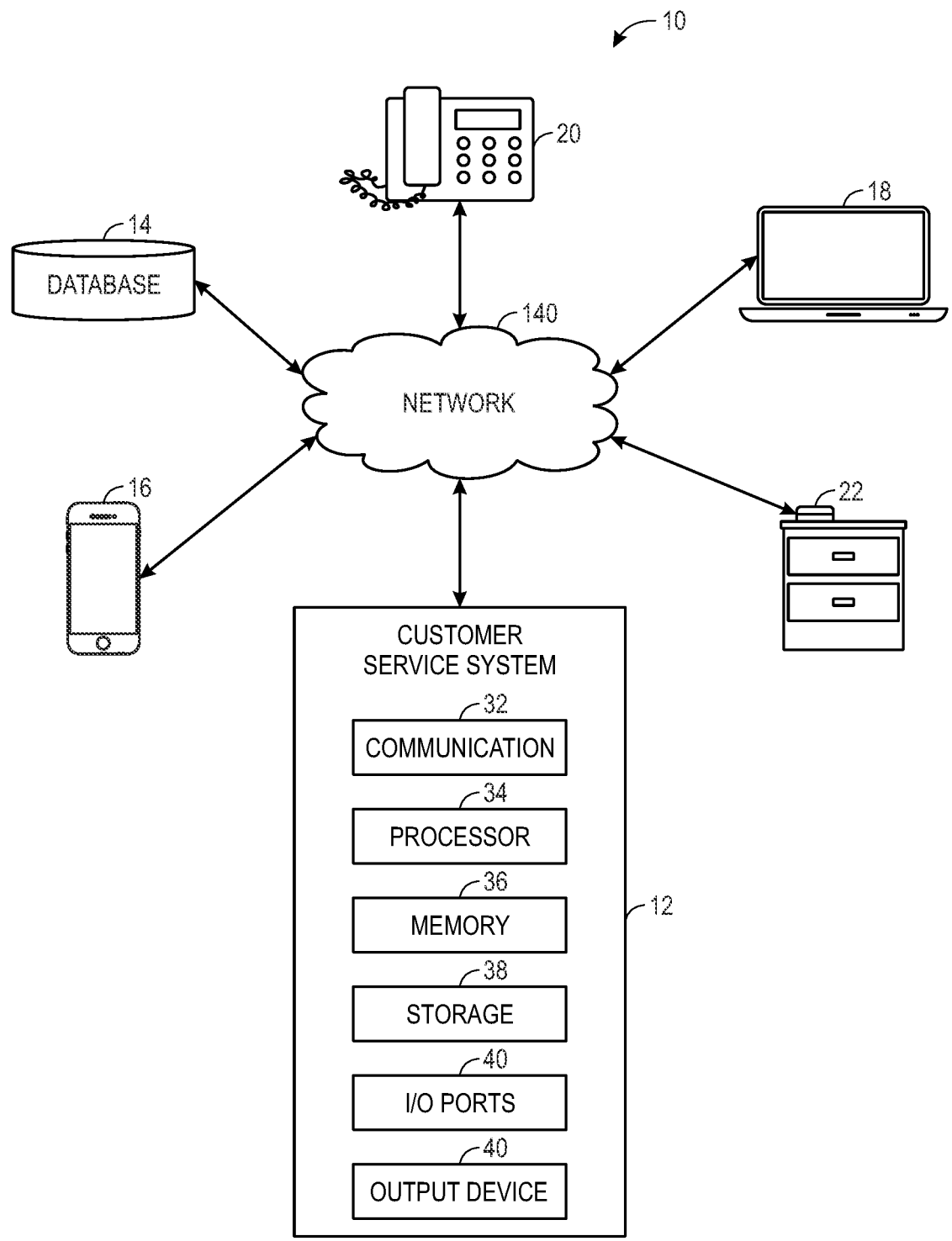
FIG. 1 illustrates a block diagram of a system that includes customer service system that may communicate with a user (e.g., customer) via a number of communication channels, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The use of various electronic devices (e.g., smart phones) has enabled users to access information and complete tasks using a variety of different communication channels. For example, a user may access a website using a computing device to submit a digital form to an organization for processing. In addition, the user may use a mobile computing device, such as a smart phone, to complete a digital form or request using an application provided by the organization. In any case, as the user works through completing a digital form, the user may stop completing the form for a variety of reasons. By way of example, the user may have become distracted and forgot to complete the digital form. The user may also have become reluctant to proceed with the digital form when the digital form requests information that the user does not have, is unfamiliar with, or does not wish to share.

With this in mind, it is now recognized that users' concerns, reluctance, or issues with completing a digital form should not prevent the users from completing the digital form or request. Indeed, may users who initially initiate a process to complete a digital form or request have a genuine interest in the product or service associated with the form. However, due to the users' inability to complete the form, the user may not gain access to the desired products or services or may seek the desired products or services from another organization or provider. To better assist the user in obtaining the desired products or services, the presently disclosed embodiments are related to reestablishing a communication session with the user using a communication channel that may better facilitate the user's completion of the digital request or form. In accordance with present embodiments, a customer service system may receive data or information regarding a progress of a user's completion of a digital request or form. In response to detecting a delay (e.g., system timeout) or that the user has stopped completing the digital form or request, the customer service system may determine or infer an intent of the user. That is, based on the type of digital form that the user is preparing, the user's progress in completing the digital form, and other characteristics regarding the user (e.g., demographic data, financial data, usage history), the customer service system may determine the intent or goal of the user in completing the digital form. In addition to the intent, the customer service system may determine or infer an obstacle or reason for the user's reluctance to complete the digital form based on the user's progress in completing the digital form and other characteristics regarding the user (e.g., demographic data, financial data, usage history).

After determining the user's intent and/or reasons for reluctance for completing the digital form, the customer service system may determine a suitable communication channel to reestablish a communication session with the user. In some embodiments, the customer service system may identify a communication channel that the user may prefer to continue completing the digital form. In some embodiments, the customer service system may identify a communication channel that enables the organization providing the product or service related to the digital form to reestablish a communication session with the user using a communication channel that may assist the user to complete the digital form. That is, based on the intent and/or the impediment of the user in completing the digital form, the customer service system may identify an appropriate communication channel to reengage the user and provide suitable information or assistance to help the user complete the previously initiated process. For example, if the user stopped completing the digital form at a point when the digital form requested salary information, the customer service system may initiate a phone call to the user to connect the user to a customer service representative that may assist the user in obtaining salary information, may provide some information related to why the salary information is requested, or provide support to the user to help complete the digital form. By reengaging the user, the customer service system may prevent the user from restarting the digital form at a later time, while helping the user obtain more information regarding the reasons for the requested information. Moreover, the organization affiliated with the customer service system may be better equipped to serve its customer base and retain customers by providing valuable insight and assistance related to the products and services that it offers. Additional details with regard to the customer service systems and its methods for reestablishing a communication session with a user will be discussed below with reference to FIGS. 1-4.

By way of introduction, FIG. 1 is a block diagram of a system 10 that includes a customer service system 12, a database 14, a mobile computing device 16, a computing device 18, a telephone 20, a smart home device 22, and the like. The customer service system 12 may be implemented in a server or a computing device as a component that tracks the activity of a user within an application, website, or other digital medium associated with an organization. That is, for example, when a user (e.g., customer) accesses a website associated with an organization and uses the website to apply for or request a product or service from the organization, the customer service system 12 may receive the request and track the progress of the user while he provides data related to the request. As such, the customer service system 12 may store data that is entered or provided by the user in regular or irregular intervals. In some embodiments, the customer service system 12 may obtain screen shots or other image data related to the progress or data entered by the user.

In some embodiments, the customer service system 12 may be communicatively coupled to the database 14 via the network 26 or other suitable communication channel. The database 14 may include information related to the user, the organization, or the like. The database 14 may store the data representative of the progress of the user. In addition, the database 14 may include information related to the user or other users that may assist the customer service system 12 to determine an intent of the user, an issue that the user is experiencing, or the like while attempting to complete the organization's digital form or request. The digital form may include any suitable form or collection of data that may be interpretable by a computing device. As such, the digital form may include digital media provided via a website or an application. The digital form may also be completed via voice tools that convert speech into text that is input into a data field interpretable by the computing device.

The user or customer may access the customer service system 12 using a variety of communication devices. For instance, the user may access the customer service system 12 via the mobile computing device 16, which may be a smart phone, a tablet computing device, or the like. In addition, the user may access the customer service system 12 via the computing device 18, which may be a personal computer, a desktop computer, a laptop computer, or the like. In some embodiments, the user may access the customer service system 12 via the telephone 20. The telephone 20 may be any suitable telephone device that facilitates voice communication. As such, the customer service system 12 may record conversations performed using the telephone 20, transcribe the conversations spoken over the telephone 20, or the like. In some embodiments, the customer service system 12 may establish a communication channel connection between a customer service representative and the user via the telephone 20 to enable the customer service representative to provide additional information or assist the user in completing the digital request.

In another embodiment, the smart home device 22 may be used to facilitate communication with the customer service system 12. The smart home device 22 may include a virtual assistant device that includes speakers and a processor that interprets spoken commands. As such, the user may complete a digital form or request via the smart home device 22, and the customer service system 12 may communicate with the user via the smart home device 22.

It should be noted that the embodiments presented herein should not be limited to the communication devices illustrated in FIG. 1. Instead, the customer service system 12 may communicate with the user via a number of communication devices and channels, such as a texting application, a chat-bot application, an Internet-based chat, email, a voice-bot application, augmented reality, virtual reality, social media, and the like.

Although the customer service system 12 is illustrated as being coupled to one database in FIG. 1, it should be noted that the customer service system 12 may be communicatively coupled to a variety of data sources that may assist the customer service system 12 in performing the embodiments described herein. For example, the customer service system 12 may be communicatively coupled to the Internet or other electronic data sources that may store information regarding users, user tendencies with respect to completing digital forms, data related to information that users desire to keep confidential, and the like.

Referring back to the customer service system 12, it should be noted that the customer service system 12 may be implemented in any suitable computer device, such as a general-purpose personal computer, a laptop computer, a tablet computer, a mobile computer, a smart phone device, and the like that is configured in accordance with present embodiments. The customer service system 12 may include various types of components that may assist the customer service system 12 in performing various types of computer tasks and operations. For example, the customer service system 12 may include a processor 32, a communication component 34, a display 36, memory/storage, 38, an input/output (I/O) port 40, and the like.

The processor 32 may be any type of computer processor or microprocessor capable of executing computer-executable code. The processor 32 may also include multiple processors that may perform the operations described below. The communication component 34 may be a wireless or wired communication component that may facilitate communication between the customer service system 12, databases, and various other computing systems via the network 26, the Internet, the devices depicted in FIG. 1, or the like. The display 36 may depict image data and visualizations associated with software or executable code being processed by the processor 32. In one embodiment, the display 36 may be a touch display capable of receiving inputs from a user of the customer service system 12. The display 36 may be any suitable type of display, such as a liquid crystal display (LCD), plasma display, or an organic light emitting diode (OLED) display, for example. Additionally, in one embodiment, the display 36 may be provided in conjunction with a touch-sensitive mechanism (e.g., a touch screen) that may function as part of a control interface for the customer service system 12.

The memory and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 32 to perform the presently disclosed techniques. As used herein, applications may include any suitable computer software or program that may be installed onto the customer service system 12 and executed by the processor 32. The memory and the storage 38 may represent non-transitory computer-readable media (e.g., any suitable form of memory or storage) that may store the processor-executable code used by the processor 32 to perform various techniques described herein. It should be noted that non-transitory merely indicates that the media is tangible and not a signal. The I/O ports 40 may be interfaces that may couple to other peripheral components such as input devices (e.g., keyboard, mouse), sensors, input/output (I/O) modules, and the like. It should be noted that the components described above with regard to the customer service system 12 are exemplary components and the customer service system 12 may include additional or fewer components than shown.

In certain embodiments, the customer service system 12 may be communicatively coupled to the database 14, the mobile computing device 16, the computing device 18, the telephone 20, the smart home device 22, or the like via the network 26 and the communication component 34. The network 26 may thus be able to connect the customer service system 12 to a number of devices via a number of communication channels.

As discussed above, as users initiate a digital form, the users may not complete the digital form for a variety of reasons. By way of example, as a user starts a digital form requesting a mortgage loan, the user may continue providing information into the form until he reaches a portion of the form that requests for information regarding an occupation of the user. In some cases, the occupation of the user may not be listed in a list presented to the user, and the user may hesitate to continue with the digital form. Continuing with this example, in certain embodiments, the customer service system 12 may track the progress of the user completing the digital form and detect that the user did not complete the digital form at the portion requesting the occupation of the user. As such, the customer service system 12 may determine an intent of the user and/or an issue that the user may have with regard to completing the digital form based on user history data that may be stored in the database 14, a portion of the digital form that the user did not proceed past, data regarding the platform or media that the user was accessing to complete the digital form, or the like.

To determine the reason that the user did not complete the digital form, in some embodiments, the customer service system 12 may analyze data on the database 14 that may include information related to other users that stop the same digital form at the same portion as the respective user. The data may include feedback from those users that the list of occupations did not include an occupation that matched their respective occupations and that this lack of occupation listing was at least one reason that the users did not continue completing the digital form. With this information at hand, the customer service system 12 may then identify a communication channel that may be suitable to enable the user to continue completing the digital form. For instance, the customer service system 12 may analyze customer preference data that may be stored in the database 14. The customer preference data may indicate a preferred communication channel, such as email, phone call, text message, smart home device message, or the like. In some embodiments, the communication channel may be determined based on the nature of the subject matter and a correlation to the type of communication channel that may be better suited to facilitate or assist the customer regarding the subject matter. After determining the appropriate communication channel, the customer service system 12 may contact the user via the appropriate communication channel.

Figure 2:
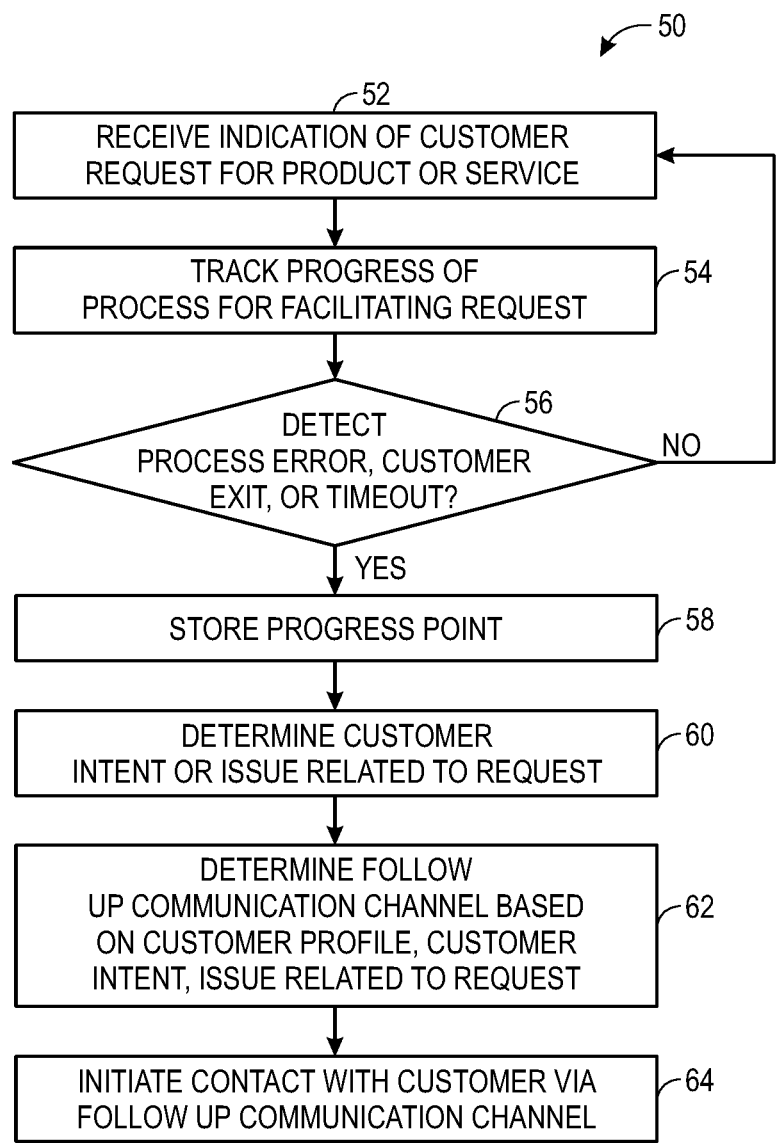
FIG. 2 illustrates a flow chart of a method for reestablishing a communication with a user via the system of FIG. 1, in accordance with embodiments described herein.

Keeping the foregoing in mind, FIG. 2 illustrates an example method 50 that may be employed by the processor 32 of the customer service system 12 to reestablish a communication session with a user to assist the user in completing a digital form or transaction. Although the following description of the method 50 is described as being performed by the processor 32, it should be noted that any suitable processor or processing device may perform the method 50. Moreover, although the method 50 is described in a particular order, it should be understood that the method 50 may be performed in any suitable order.

Referring now to FIG. 2, at block 52, the processor 32 may receive an indication of a customer (e.g., user) request for a product or service. The processor 32 may be communicatively coupled to a website or server that enables a customer to request the product or service. As such, the customer may access the website or server via the mobile computing device 16, the computing device 18, the telephone 20, the smart home device 22, or the like. In some embodiments, the customer using the telephone 20 may engage with the server or the processor 32, which may facilitate the request, using a touch tone phone, spoken responses, or via conversation with a customer service representative. The conversation with the customer service representative may be recorded by the customer service system 12, or the customer service representative may transcribe or enter the inputs from the customer into the website or the server.

After receiving the indication, the processor 32 may track the progress of the customer entering data to complete the request for the product or the service. In certain embodiments, the request for the service may be facilitated by an organization after the customer completes a digital form. As such, as the customer enters information or data into the digital form, the processor 32 may track or store the data entered into the digital form. The entered data may be stored in a temporary storage element that may be deleted after the customer has completed the digital form, the processor 32 determines that the customer is no longer interested in the associated product or service, or the like. The tracked or stored data may enable the processor 32 to recreate or assist the customer in completing the digital form without having the customer reenter the previously provided information.

At block 56, the processor 32 may detect whether the customer has stopped his or her progress in completing a digital form. To detect this stoppage, the processor 32 may determine whether digital form, website, application, or other communication medium that the customer was using has experienced an error, a user exit, a timeout, or the like. That is, in some embodiments, when a digital form or website experiences an error due to technical issues (e.g., server connection), the digital form or website may generate an error notification that may provide an indication that the associated process has experienced an error. The error notification may be transmitted to the processor 32 or some other computing device to help developers identify and resolve the problem.

In some embodiments, if the customer proceeds to a particular point of a digital form and then exits the communication session (e.g., website, application) or logs out of his account, the processor 32 may detect that the customer has stopped his progress. In the same manner, if the processor 32 detects that the communication session has timed out or automatically exited due to inactivity by the customer for a certain period of time, the processor 32 may determine that the customer has stopped progress on the digital form.

If the processor 32 detects that the customer has stopped progress, the processor 32, at block 58, may store a progress point of the customer with respect to the digital form that the customer was completing. As discussed above, the data entered by the customer may be stored in a temporary storage. In addition, an indication that corresponds to a particular data field or point in the digital form may also be saved in the temporary storage or any other suitable storage component. In some embodiments, the progress point may be stored as temporary data cache that may be appended to customer profile data stored in the database 14. In another embodiment, each communication session that includes the customer may be stored in the database 14 with an identification tag that corresponds to the customer and a time stamp that corresponds to the last time in which the data was saved. The processor 32 may later query the database 14 based on the identification tag, the time stamp, and the like to retrieve the last progress point for the customer. The progress point may also include information related to a count or a number of attempts by the customer or attempts by the customer within a certain time period that correspond to completing the digital form.

Based on the point at which the customer stopped his progress, the processor 32, at block 60, may determine a customer intent or issue related to the customer's inability or reluctance to complete the digital form. By way of example, the processor 32 may determine the customer's intent based on the type of digital form that is being completed. That is, if the digital form is related to applying for life insurance, the processor 32 may determine that the customer's intent is to obtain a life insurance policy.

In addition, the processor 32 may determine an issue or problem with completing the digital form based on the progress point that the processor 32 detected at block 58. In one embodiment, the progress point may be related to a type of question or data field that the customer has not provided data for. In this case, the processor 32 may determine that the issue or problem for the customer completing the digital form is related to the particular question or data entry field that the customer did not proceed past.

The progress point may also include an indication of a number of completed portions of the digital form, as well as one or more incomplete portions of the digital form. That is, the customer may skip certain questions in the digital form for a variety of reasons and then decide to forgo completing the digital form due to the incomplete portions. In this case, the progress point may provide an indication or snap shot of the progress of the entire digital form including the portions of the digital form that was not completed. In some embodiments, the processor 32 may use the incomplete portions of the form to determine the intent/issue with regard to completing the digital form.

In other embodiments, the processor 32 may determine the customer's intent and/or issue based on an analysis of other customer data available to the processor 32. For example, the database 14 may include data concerning the behavior of other customers that accessed the digital form. The data may include feedback data from the other customers that indicate reasons for reluctance to complete the same digital form. Example reasons may include that the customer's job occupation is not listed, the customer's reluctance to provide certain information (e.g., social security number), a question related to the particular data entry field, or the like. Additional details with regard to determining the customer's intent and/or issue is described below with reference to FIG. 3.

After determining the customer's intent or issue at block 60, the processor 32 may proceed to block 62 and determine a communication channel to use to follow up with the user with regard to the incomplete digital form. In certain embodiments, the processor 32 may determine the appropriate communication channel to use based on a customer profile for the respective customer, the determined customer intent, the determined issue that the customer is experiencing, and the like. By way of example, FIG. 4, which will be discussed in greater detail below, illustrates a flow chart of a method for determining the appropriate follow up channel.

After determining the follow-up channel to use, the processor 32 may, at block 64, initiate a communication session between a customer service representative and the customer via the customer service system 12 using the follow-up channel identified at block 60. For example, the processor 32 may send a text message to the mobile computing device 16 associated with the customer that provides a link to the partially complete digital form, along with instructions regarding how to overcome an inferred issue. In other embodiments, the processor 32 may initiate a phone call between a customer service representative and the customer to assist the customer in completing the digital form. In some cases, the processor 32 may have access to customer profile data that provides information regarding the preferred communication channel for the customer. The processor 32 may then initiate the communication session between the customer and a customer service representative using the preferred communication channel.

In addition to determining the appropriate follow-up channel, the processor 32 may identify a customer service representative that may be suited to interact with the respective customer based on the customer profile. By way of example, the customer profile data may indicate that the customer is a current or former member of the military. As such, the processor 32 may identify a customer service representative that has a military background or experience to connect to the customer via the communication session. To identify the customer service representative, the processor 32 may consult a database that stores profile data for each of the customer service representatives. The profile date for the customer service representative may include a work history, an employer history, demographic data, a residential location, a language preference, a list of spoken languages, a subject matter expertise, and the like. Based on the issue that the customer is experiencing and the customer profile data, the processor 32 may consult the profile data regarding the customer service representatives to identify one or more representatives that may share some common background or characteristics. That is, it may be easier for the customer to work with someone that he or she feels has a similar background when solving a problem and learning more about a product or service. This trust may enable the organization to provide better service to the customers and assist the customer in completing various digital forms in an efficient manner.

Referring back to block 60, as mentioned above, FIG. 3 illustrates a method 70 for determining a customer intent or issue related to completing a digital form in accordance with the embodiments presented herein. As discussed above with respect to the method 50, although the following description of the method 70 is described as being performed by the processor 32, it should be noted that any suitable processor or processing device may perform the method 70. Moreover, although the method 70 is described in a particular order, it should be understood that the method 70 may be performed in any suitable order.

Figure 3:
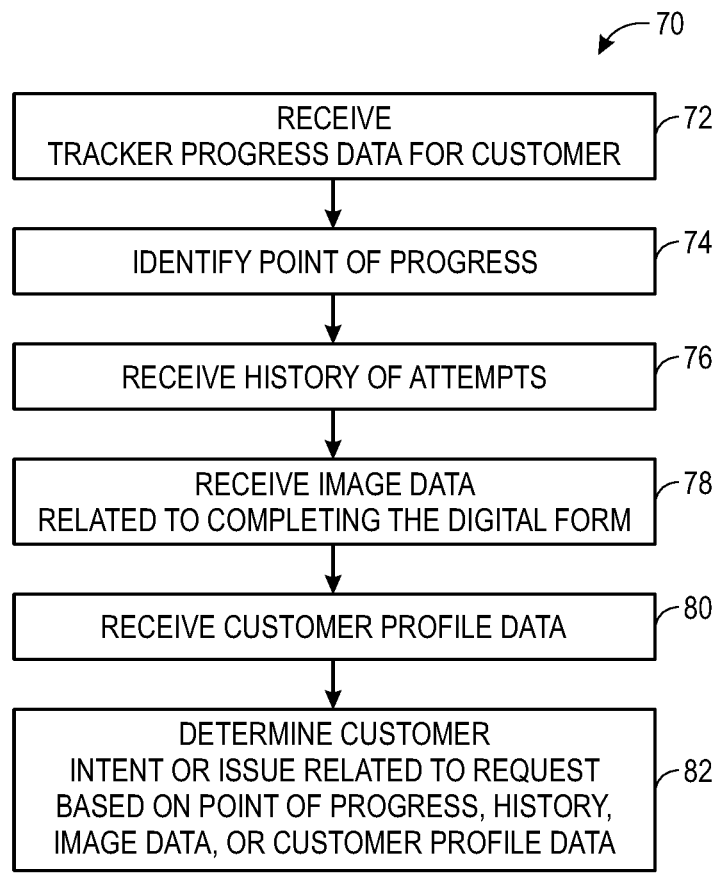
FIG. 3 illustrates a flow chart of a method for determining user intent for a communication session via the system in FIG. 1, in accordance with embodiments described herein.

Turning now to FIG. 3, at block 72, the processor 32 may receive the tracked progress data or point for the customer from the database 14 or the like. The tracked progress point may include an indication of a particular digital form that the customer was preparing, an indication of the last entry in which data has been entered, an indication of the completed entries and the incomplete entries of the digital form, an indication of the user's behavior (e.g., cursor movement, drop list access) with the digital form, and the like. As mentioned above, the tracked progress data may be stored as part of a temporary cache data appended to a customer profile or file that may be stored in the database 14 or other suitable storage component.

At block 74, the processor 32 may identify the point of progress of the customer in completing the digital form based on the data received at block 72. In one embodiment, the processor 32 may indicate that that last completed data entry field corresponds to the point of progress. Alternatively, the skipped data entry fields, along with the completed data entry fields, may be used as the point of progress. In other embodiments, the processor 32 may determine whether an error code or message is associated with the customer's attempt to complete the digital form. That is, the server hosting the digital form may propagate flags or notifications to indicate to the processor 32 that an error is present with the respective digital form. The flag or notification may correspond to an error code that may be interpretable by a developer. As such, the developer may use the error code to determine a section of code that the error is being generated or provide some indication with regard to the cause of the error.

At block 76, the processor 32 may receive data indicative of a number of attempts that the customer attempted to complete a particular data entry field, complete the digital form, and the like. The number of attempts may indicate that an error is present with respect to the respective data entry field, the digital form, the medium (e.g., application, website) hosting the digital form, or the like. In some embodiments, the number of attempts data may be received along with a time period in which the number of attempts occurred. If the number of attempts occur within a first time period, the processor 32 may glean that the customer may wish to finish the digital form sooner, as compared to if the number of attempts being within a second time period that is longer than the first time period.

At block 78, the processor 32 may receive image data related to the customer's progress in completing the digital form. As such, the processor 32 may, in some embodiments, receive screen shots or image data that correspond to various stages in which the customer is progressing through completing the digital form. By way of example, the image data may include a screen shot or a portion of a screen shot that includes the data entered in each data entry field of the digital form. The image data may include a time stamp or timing data indicative of the time in which the image was captured. In some embodiments, if the image data does not change over a certain amount of time, the processor 32 may determine that the digital form or the host of the digital form has become unresponsive (e.g., frozen). The image data for the customer may be stored as part of the customer profile data in the database 14 or other suitable storage.

At block 80, the processor 32 may receive the customer profile data mentioned above. The customer profile data may include information related to the particular customer completing the digital form or other customers that previously completed or attempted to complete the digital form. The information may include data related to the intent and/or issue encountered by the other customers. In some cases, the customers with the same demographics may experience similar issues or have the same intent with regard to completing a digital form. As such, survey data or other feedback acquired from these other customers may be acquired and stored in a database as part of respective customer profile data for the respective customer. The intent and/or issue encountered by the other customers may help enable the processor 32 identify the intent and/or issue encountered by the customer whose progress is currently being tracked by the processor 32.

At block 82, the processor 32 may determine the customer intent and/or issue related to the digital form based on the point of progress, the history of attempts, the image data, the customer profile data, and the like. That is, the data received at blocks 72, 74, 76, 78, and 80 may be employed by the processor 32 to determine the intent and/or issue encountered by the customer. In some embodiments, the point of progress may indicate to the processor 32 that the customer has a specific issue with respect to the question or inquiry immediately after the last entry provided by the customer. The history of attempts may provide an indication of importance or a time frame in which the customer wishes to complete the digital form. In addition, if the number of attempts is related to a particular part or portion of the digital form, the processor 32 may determine that the customer is experiencing an error with the digital form or the host of the digital form. The image data may provide an indication of what the customer is viewing via the display 36 or the like. In addition, the image data may provide some insight into the customer's reluctance or uncertainty with regard to completing a part of the digital form. For instance, if different screen shots indicate that the customer repeatedly switches between two selections of a drop-down list, the processor 32 may determine that the customer is uncertain how to complete the respective question and may not find an answer in the drop-down list that best suits his or her answer.

The processor 32 may also use the customer profile data for the customer and the other customers who previously attempted to complete the digital form to determine the intent and/or issue encountered by the customer. As mentioned above, other customers who have similar background, occupation, residence, and other properties similar to the customer whose progress is being tracked may provide some insight into the intent and/or issue encountered by that customer. As such, the processor 32 may use a combination of the data received during the method 70 to determine a likely intent or issue of the customer. For example, if other customers stopped at a particular question in the digital form and more than a threshold (e.g., 50%) of the other customers indicated that the reason that they stopped was that they were not sure why that particular question was relevant to the application, the processor 32 may identify this reason as the potential issue for the customer.

Figure 4:
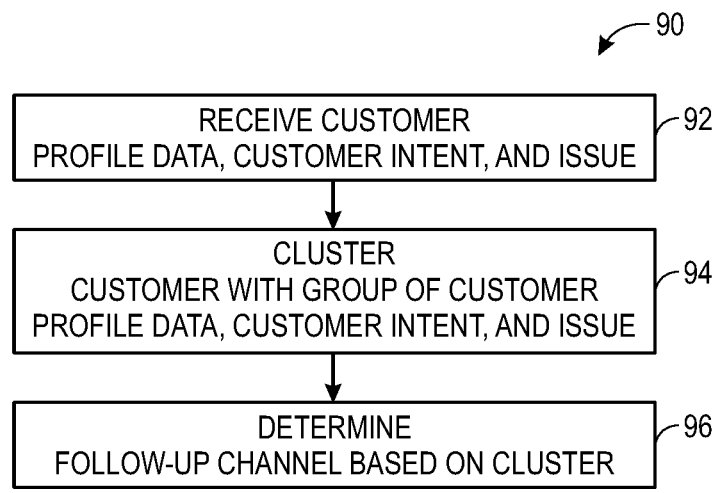
FIG. 4 illustrates a flow chart of a method for determining an appropriate communication channel to reengage the user via the system of FIG. 1, in accordance with embodiments described herein.

In any case, the determined customer intent and/or issue may be used by the processor 32 to determine an appropriate communication channel to employ to reestablish a communication session with the customer. For example, FIG. 4 illustrates a method 90 for determining a follow-up communication channel to reestablish a communication session with the customer. Although the following description of the method 90 is described as being performed by the processor 32, it should be noted that any suitable processor or processing device may perform the method 90. Moreover, although the method 90 is described in a particular order, it should be understood that the method 90 may be performed in any suitable order.

Referring to FIG. 4, at block 92, the processor 32 may receive the customer profile data, the determined intent, the determined issue, and the like as described above. Based on the received data, the processor 32, at block 94, may cluster or group the customer with a number of other customers that have similar profiles, portions of profile data, intent, and/or issues with the digital form.

At block 96, the processor 32 may use the cluster or group of other customers to determine a communication channel to use to follow up or reestablish a communication session with the customer. In some embodiments, the processor 32 may identify an intersection or commonality between other customers that have a similar customer profile, similar determined intent, similar determined issue, or the like as the customer to identify a communication channel. For example, if the customer's determine intent is to obtain a life insurance policy, the determined issue is related to an occupation, and the customer profile is similar to other customers that have an occupation that is not listed in the list of options provided in the digital form for obtaining a life insurance policy, the processor 32 may determine which communication channel was used by the other customers to resolve this issue. As discussed above, certain groups of individuals having the same background or characteristics may prefer similar communication channels. As such, the processor 32 may use the similarities between customers to determine an appropriate communication channel to use.

In some embodiments, the customer profile data may include details regarding each customer such as an age, occupation, a communication channel preference, a job history, a residential location, and the like. The customer profile data may thus enable the processor 32 to identify a cluster or group of customers that share similar properties as the customer attempting to complete the digital form. The customer cluster or group may provide the processor 32 with information regarding how the customer may wish to continue a communication session after encountering the detected issue. That is, in some embodiments, the processor 32 may use the determined intent and/or issue to query a database that includes information regarding how other similar customers continued the digital form or process in light of the same intent and/or issue. The information may be collected using surveys and other suitable methods after the other customers resolved an issue, completed a digital form, or the like. In this way, the processor 32 may use this information to better determine the appropriate communication channel to use to reconnect with the customer.

It should be noted that the customer profile data for the customer attempting to complete the digital form, the determined intent, or the determined issue may be used individually or in any suitable combination by the processor 32 to determine an appropriate communication channel. For example, if the issue is determined to be related to identifying a reason that some information request is relevant to the requested product or service, the processor 32 may determine an appropriate communication channel that may be used to convey that information. In one example, detailed reasons (e.g., more than two sentences) may be communicated via the telephone 20 to ensure that the customer understands the reasons and is afforded the ability to ask additional questions. In addition, the processor 32 may initiate a chat-bot application that may communicate with the customer via the mobile computing device 16, such that the chat-bot application may provide answers to the customer's questions using an artificial intelligence module or the like.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A computing device comprising one or more processors configured to perform one or more operations comprising:
receiving a notification that a user has not completed a digital form, wherein the digital form receives input data from the user via an additional computing device;
determining one or more issues associated with the user not completing the digital form based on the digital form and a progress point corresponding to a portion of the digital form that the user has not completed;
retrieving a data profile associated with the user from a database in response to receiving the notification, wherein the database comprises a plurality of data profiles associated with a plurality of users;
identifying a cluster of the plurality of data profiles based on the data profile and the one or more issues;
determining one or more instructions related to overcoming the one or more issues based on the cluster of the plurality of data profiles; and
establishing a communication session with the additional computing device via one or more text messages, wherein the one or more text messages comprise:
a component configured to access the digital form that has not been completed; and
the one or more instructions related to overcoming the one or more issues.

2. The computing device of claim 1, wherein the cluster of the plurality of users comprise one or more users that that have previously started the digital form.

3. The computing device of claim 1, wherein the one or more issues are determined based on a type of question presented on the digital form.

4. The computing device of claim 1, wherein the one or more instructions comprise information indicative of a reason for obtaining requested information in the digital form, a location that corresponds to obtaining the requested information in the digital form, or both.

5. The computing device of claim 4, wherein the information related to the one or more instructions further comprises contact information to reach a customer service representative, wherein the customer service representative shares at least one property with the data profile associated with the user.

6. The computing device of claim 1, wherein the computing device comprises a mobile computing device, a telephone, a computer, or a smart home device.

7. The computing device of claim 1, wherein the one or more processors are configured to determine that the user has not completed the digital form based on a process error associated with the digital form, an indication that the user exited the digital form, a timeout associated with the digital form, or any combination thereof.

8. The computing device of claim 1, wherein the one or more processors are configured to determine the one or more issues by determining a threshold number of users of the plurality of users that indicated the one or more issues associated with the progress point.

9. A non-transitory computer-readable medium comprising computer-executable instructions that, when executed, are configured to cause one or more processors to perform one or more operations comprising:
receiving a notification that a user has not completed a digital form, wherein the digital form receives input data from the user via an additional computing device;
determining one or more issues associated with the user not completing the digital form based on the digital form and a progress point corresponding to a portion of the digital form that the user has not completed;
retrieving a data profile associated with the user from a database in response to receiving the notification, wherein the database comprises a plurality of data profiles associated with a plurality of users;
identifying a cluster of the plurality of data profiles based on the data profile and the one or more issues;
determining one or more instructions related to overcoming the one or more issues based on the progress point and the cluster of the plurality of data profiles; and
establishing a communication session with the additional computing device via a chat-bot application, wherein the chat-bot application is configured to present:
a component configured to access the digital form that has not been completed; and
the one or more instructions related to overcoming the one or more issues.

10. The non-transitory computer-readable medium of claim 9, wherein the progress point corresponds to an incomplete portion of the digital form.

11. The non-transitory computer-readable medium of claim 10, wherein the computer-executable instructions are configured to cause the one or more processors to perform the one or more operations comprising determining the one or more instructions related to overcoming the one or more issues based on a type of question presented on the digital form.

12. The non-transitory computer-readable medium of claim 9, wherein the computer-executable instructions are configured to cause the one or more processors to perform the one or more operations comprising updating the database to include a user profile associated with the user, the progress point, and the one or more issues.

13. The non-transitory computer-readable medium of claim 9, wherein the progress point comprises an indication of a number of completed portions and a number of incomplete portions of the digital form.

14. The non-transitory computer-readable medium of claim 9, wherein the one or more operations comprises storing data associated with one or more portions of the digital form as it is completed by the user in a temporary storage element.

15. The non-transitory computer-readable medium of claim 14, wherein the one or more operations comprises deleting the data in the temporary storage element after the user has completed the digital form.

16. A method, comprising:
receiving, via at least one processor, a notification that a user has not completed a digital form, wherein the digital form receives input data from the user via an additional computing device;
determining, via the at least one processor, one or more issues associated with the user not completing the digital form based on the digital form and a progress point corresponding to a portion of the digital form that the user has not completed;
retrieving, via the at least one processor, a data profile associated with the user from a database in response to receiving the notification, wherein the database comprises a plurality of data profiles associated with a plurality of users;
identifying, via the at least one processor, a cluster of the plurality of data profiles based on the data profile and the one or more issues;
determining, via the at least one processor, one or more instructions related to overcoming the one or more issues based on the progress point and the cluster of the plurality of data profiles; and
initiating, via the at least one processor, a communication session with the additional computing device via one or more emails, wherein the one or more emails comprise:
a component configured to access the digital form that has not been completed; and
the one or more instructions related to overcoming the one or more issues.

17. The method of claim 16, wherein the cluster of the plurality of users comprise one or more user that that have previously started the digital form.

18. The method of claim 16, wherein the one or more issues are determined based on a type of question presented on the digital form.

19. The method of claim 16, wherein the one or more instructions comprise information indicative of a reason for obtaining requested information in the digital form, a location that corresponds to obtaining the requested information in the digital form, or both.

20. The method of claim 16, wherein the one or more instructions comprise information indicative of contact information to reach a customer service representative, wherein the customer service representative shares at least one property with the data profile associated with the user.

* * * * *